United States Patent
Salsamendi

(10) Patent No.: US 9,742,796 B1
(45) Date of Patent: Aug. 22, 2017

(54) AUTOMATIC REPAIR OF CORRUPT FILES FOR A DETONATION ENGINE

(71) Applicant: Palo Alto Networks, Inc., Santa Clara, CA (US)

(72) Inventor: Ryan C. Salsamendi, Campbell, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 14 days.

(21) Appl. No.: 14/859,087

(22) Filed: Sep. 18, 2015

(51) Int. Cl.
*H04L 29/06* (2006.01)
*G06F 21/56* (2013.01)

(52) U.S. Cl.
CPC .......... *H04L 63/145* (2013.01); *G06F 21/562* (2013.01); *G06F 21/566* (2013.01); *G06F 21/568* (2013.01); *G06F 2221/034* (2013.01)

(58) Field of Classification Search
CPC ... H04L 63/145; G06F 21/562; G06F 21/566; G06F 21/568; G06F 2221/034
See application file for complete search history.

(56) References Cited

U.S. PATENT DOCUMENTS

| | | | |
|---|---|---|---|
| 5,842,002 A | 11/1998 | Schnurer et al. | |
| 5,854,916 A | 12/1998 | Nachenberg | |
| 6,067,410 A * | 5/2000 | Nachenberg | G06F 21/53 703/28 |
| 6,775,780 B1 | 8/2004 | Muttik | |
| 7,231,667 B2 | 6/2007 | Jordan | |
| 7,370,360 B2 | 5/2008 | van der Made | |
| 7,409,719 B2 | 8/2008 | Armstrong et al. | |
| 8,104,092 B1 * | 1/2012 | Emigh | G06F 17/30011 726/26 |
| 8,151,352 B1 | 4/2012 | Novitchi | |
| 8,365,297 B1 | 1/2013 | Parshin et al. | |
| 8,510,838 B1 | 8/2013 | Sun et al. | |
| 8,695,096 B1 | 4/2014 | Zhang | |
| 8,739,283 B1 * | 5/2014 | Zhang | G06F 21/568 726/22 |
| 8,914,888 B1 * | 12/2014 | Satish | G06F 21/57 709/223 |
| 9,009,836 B1 | 4/2015 | Yarykin et al. | |
| 9,047,441 B2 | 6/2015 | Xie et al. | |
| 2005/0223362 A1 * | 10/2005 | Whitlock | G06F 11/3672 717/126 |

(Continued)

OTHER PUBLICATIONS

Xu, J-Y., et al. "Polymorphic malicious executable scanner by API sequence analysis." Hybrid Intelligent Systems, 2004. HIS'04. Fourth International Conference on. IEEE, 2004.*

(Continued)

*Primary Examiner* — Chau Le
*Assistant Examiner* — Muhammad Chaudhry
(74) *Attorney, Agent, or Firm* — Van Pelt, Yi & James LLP

(57) ABSTRACT

Techniques for automatic repair of corrupt files (e.g., malware sample files) for a detonation engine are disclosed. In some embodiments, a system, process, and/or computer program for automatic repair of corrupt files for a detonation engine includes receiving a malware sample from a network device; determining whether the malware sample includes a corrupt file; and in an event that the malware sample is determined to include the corrupt file, repairing the corrupt file for the detonation engine.

8 Claims, 5 Drawing Sheets

(56) References Cited

U.S. PATENT DOCUMENTS

| | | | | |
|---|---|---|---|---|
| 2007/0192761 | A1* | 8/2007 | Sahita | G06F 21/53 |
| | | | | 717/140 |
| 2008/0222729 | A1 | 9/2008 | Chen et al. | |
| 2010/0185690 | A1* | 7/2010 | Evans | G06F 17/30073 |
| | | | | 707/803 |
| 2011/0029805 | A1* | 2/2011 | Pericin | G06F 11/0715 |
| | | | | 714/2 |
| 2011/0219450 | A1* | 9/2011 | McDougal | G06F 21/56 |
| | | | | 726/23 |
| 2011/0225128 | A1* | 9/2011 | Jarrett | G06F 8/61 |
| | | | | 707/692 |

OTHER PUBLICATIONS

Perdisci, Roberto, Andrea Lanzi, and Wenke Lee. "Classification of packed executables for accurate computer virus detection." Pattern Recognition Letters 29.14 (2008): 1941-1946.*

Wang, Tzu-Yen, Chin-Hsiung Wu, and Chu-Cheng Hsieh. "Detecting unknown malicious executables using portable executable headers." INC, IMS and IDC, 2009. NCM'09. Fifth International Joint Conference on. IEEE, 2009.*

Wicherski, Georg. "peHash: A Novel Approach to Fast Malware Clustering." LEET. 2009.*

Yan, Wei, Zheng Zhang, and Nirwan Ansari. "Revealing packed malware."ieee seCurity & PrivaCy 6.5 (2008).*

Shin, DaeMin, et al. "Data Hiding in Windows Executable Files." Australian Digital Forensics Conference. 2008.*

Hardy, Matthew RB, and David F. Brailsford. "Mapping and displaying structural transformations between XML and PDF." Proceedings of the 2002 ACM symposium on Document engineering. ACM, 2002.*

Author Unknown, Compound File Binary File Format, Microsoft Corporation, Jun. 30, 2015.

Beytullah Yildiz, International Journal on Advances in Security, IARA, 2013.

Bayer et al., A View on Current Malware Behaviors, Mar. 31, 2009.

Goyal et al., Obfuscation of Stuxnet and Flame Malware, 2012.

Doug Hyde, A Survey on the Security of Virtual Machines, Apr. 21, 2009.

Yusirwan S et al., Implementation of Malware Analysis using Static and Dynamic Analysis Method, International Journal of Computer Applications, vol. 117, No. 6, May 2015.

Zhao et al., Virtual Machine Security Systems, Advances in Computer Science and Engineering, 2009.

* cited by examiner

AUTOMATIC REPAIR OF CORRUPT FILES FOR A DETONATION ENGINE

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
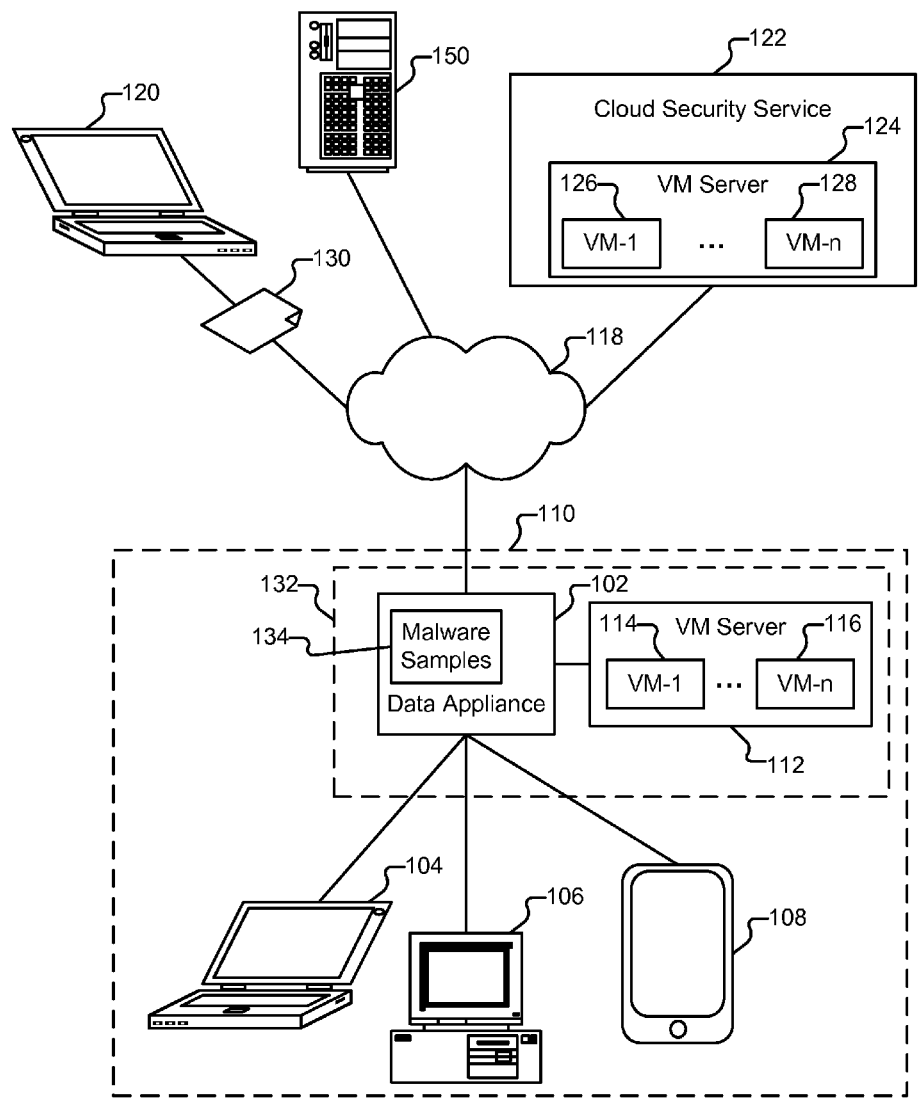
FIG. 1 illustrates an example of an environment in which malware is detected and its harm is reduced by performing automatic repair of corrupt files for a detonation engine in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Network devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS)

request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. located in Santa Clara, Calif. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an advanced threat, such as an Advanced Persistent Threat (APT) (e.g., technically advanced adversaries that employ various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. Accordingly, there exists an ongoing need for improved techniques to detect malware and prevent its harm.

Overview of Techniques for Automatic Repair of Corrupt Files for a Detonation Engine Security techniques for detecting malware include signature-based detection techniques. However, as similarly discussed above, signature-based detection techniques are generally ineffective for new exploits and zero-day threats as a signature has not yet been created for such new malware threats.

Security techniques for detecting malware also include dynamic analysis techniques that include executing a malware sample in a virtualized execution environment (e.g., executed in an instrumented virtual environment) and monitoring a behavior of the malware sample to determine whether the malware sample is malicious (e.g., malicious or suspicious). Such dynamic analysis techniques can be effective in detecting malware and preventing its harm, including for new exploits and zero-day threats.

However, a technical problem with relying on such more advanced, dynamic analysis security techniques is that corrupt files (e.g., a malware sample that includes a corrupt file, such as a file that is truncated/incomplete or otherwise corrupted) cannot be executed in the virtualized execution environment (e.g., fails to detonate/cannot be executed by the detonation engine). As a result, the dynamic analysis of malware samples that include such corrupt files typically cannot determine whether such malware samples are malicious or not, and as such, are generally marked benign as a result of such dynamic security analysis techniques.

Thus, what are needed are new and improved techniques for automated repair of malware samples.

Accordingly, techniques for automatic repair of corrupt files (e.g., malware sample files) for a detonation engine are disclosed. In some embodiments, a system, process, and/or computer program for automatic repair of corrupt files for a detonation engine includes receiving a malware sample from a network device; determining whether the malware sample includes a corrupt file; and in an event that the malware sample is determined to include the corrupt file, repairing the corrupt file for the detonation engine.

In one embodiment, a system, process, and/or computer program for automatic repair of corrupt files for a detonation engine further includes automatically modifying the corrupt file to allow the malware sample to be executed in an instrumented virtual environment (e.g., an emulation environment) using the detonation engine.

In one embodiment, a system, process, and/or computer program for automatic repair of corrupt files for a detonation engine further includes determining that the malware sample includes the corrupt file during a dynamic analysis of the malware sample (e.g., based on a failed attempt to detonate the malware sample using the detonation engine).

In one embodiment, a system, process, and/or computer program for automatic repair of corrupt files for a detonation engine further includes determining that the malware sample includes the corrupt file during a static analysis of the malware sample (e.g., based on a pre-screening of the malware sample to determine whether the malware sample includes the corrupt file).

As such, techniques are disclosed for automatically repairing various errors that can be associated with corrupt files in malware samples. For example, errors in the portable executable (PE) file format (e.g., the PE format is a file format for executables, object code, DLLs, and others used in 32-bit and 64-bit versions of the Microsoft Windows® operating systems) can be automatically repaired in order to allow them to detonate in a virtualized execution environment, such as further described below with respect to various embodiments. A common error in PE files of malware samples is truncated sections. If the length of the section in the PE header is updated to the actual length, the PE can be detonated using a detonation engine (e.g., the Windows PE loader will allow the repaired PE files to be executed). As further described below, by applying the disclosed techniques for automatically repairing various errors that can be associated with corrupt files in malware samples, some or all of the malicious behavior can be monitored and determined using such more advanced, dynamic analysis security techniques.

As a result, customers who may or may not be aware that a malware sample submitted to a cloud security service for malware analysis was corrupt are able to obtain a determination on whether some or all of the malicious behavior can be monitored and determined using such more advanced, dynamic analysis security techniques and are not shown a benign result when other approaches (e.g., signature-based approaches) potentially mark the malware sample as malicious. Additionally, some malware may be downloaded in chunks or encoded in some way so they can only be executed when re-assembled or decoded. Some of these partially downloaded/decoded malware samples can similarly be analyzed using the disclosed techniques, such as will be further described below.

Accordingly, various techniques for performing automatic repair of corrupt files (e.g., malware sample files) for a detonation engine are disclosed. For example, various techniques for performing automatic repairing of malware sample files for a detonation engine for various file types are disclosed. As will be apparent to one skilled in the art in view of the various techniques and embodiments described herein, the various techniques described herein for performing automatic repair of corrupt files (e.g., malware sample files) for a detonation engine can similarly be performed using cloud-based security solutions, network device-based security solutions, host-based/agent-based security solutions, and/or virtualized/software-defined networking (SDN)-based security solutions, such as further described below with respect to various embodiments.

A System Architecture for Automated Repair of Malware Samples for a Detonation Engine FIG. 1 illustrates an example of an environment in which malware is detected and its harm is reduced by performing automatic repair of corrupt files for a detonation engine in accordance with some embodiments. In the example shown in FIG. 1, a malicious individual (using system 120) has created malware 130. The malicious individual hopes that a client device, such as client device 104, will execute a copy of malware 130, compromising the client device, and causing the client device, for example, to become a bot in a botnet. The compromised client device can then be instructed to perform tasks (e.g., cryptocurrency mining, participating in denial of service attacks, and/or other malicious or unwanted activity) and to report information to an external entity, such as command and control (C&C) server 150, as well as to receive instructions from C&C server 150, as applicable.

Returning to the example shown in FIG. 1, suppose client devices 104, 106, and 108 are a laptop computer, a desktop computer, and a tablet or smart phone, respectively, present in an enterprise network 110 (e.g., belonging to the "Acme Company"). Data appliance 102 (e.g., a security device) is configured to enforce policies regarding communications between clients, such as clients 104 and 106, and nodes outside of enterprise network 110 (e.g., reachable via external network 118, including the Internet). Examples of such policies include ones governing traffic shaping, quality of service, and routing of traffic. Other examples of policies include security policies such as ones requiring the scanning for threats in incoming and/or outgoing email attachments, website downloads, files exchanged through instant messaging programs, and/or other file transfers. In one embodiment, appliance 102 is also configured to enforce policies with respect to traffic that stays within enterprise network 110.

Appliance 102 can take a variety of forms. For example, appliance 102 can comprise a dedicated device or set of devices. The functionality provided by appliance 102 can also be integrated into or executed as software on a general purpose computer, a computer server, a gateway, and/or a network/routing device. In one embodiment, services provided by data appliance 102 are instead (or in addition) provided to a client device, such as client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be included in embodiments of system 102 as applicable.

As will be described in more detail below, appliance 102 can be configured to work in cooperation with one or more virtual machine servers (112, 124) to perform malware analysis/prevention. As one example, data appliance 102 can be configured to provide a copy of malware 130, shown as stored in malware samples data store 134 of data appliance 102, to one or more of the virtual machine servers for real-time analysis, in which the malware is executed in an instrumented virtual environment (e.g., where various user level hooks and/or kernel level hooks in an execution environment emulated in a virtual environment facilitate the monitoring of various program behaviors during execution in the virtual environment). As another example, service 122 can provide a list of signatures of known-malicious files to appliance 102 as part of a subscription. Those signatures can be generated by cloud security service 122 in conjunction with the techniques described herein. As yet another example, and as will be described in more detail below, results of analysis performed by the virtual machine servers can be used to generate/maintain new signatures of files determined to be malicious, blacklists of domains determined (or suspected) to be generated by/embedded in malware, and/or to take other actions.

In various embodiments, data appliance 102 includes a malware sample(s) 134, which can be sent to cloud security service 122 (e.g., and can also be provided by a third party, such as one that is different from the provider of appliance 102 or cloud security service 122).

An example of a virtual machine server is a physical machine comprising commercially available server-class hardware (e.g., a multi-core processor, 64+Gigabytes of RAM, and one or more Gigabit network interface adapters) that runs commercially available virtualization software, such as VMware ESXi, Citrix XenServer, Kernel Based Virtual Machine (KVM), or Microsoft Hyper-V. The virtual machine server can be configured to run a customized hypervisor (e.g., whether as a modified version of a commercially-available hypervisor, or a custom-built hypervisor).

Returning to the example of FIG. 1, the virtual machine servers can be separate from, but in communication with, data appliance 102, as shown. A virtual machine server can also perform some or all of the functions of data appliance 102 (e.g., or the subset of functions described herein), and a separate data appliance 102 omitted as applicable. Further, a virtual machine server can be under the control of the same entity that administers data appliance 102 (e.g., virtual machine server 112); the virtual machine server can also be provided by a third party (e.g., virtual machine server 124 in which the samples can similarly be executed (or opened in an application, as applicable) in one or more virtual machine instances 126 and 128, which can be configured to provide services to appliance 102 via third party service 122). In one embodiment, data appliance 102 is configured to use one or the other of virtual machine servers 112 and 124 for malware analysis. In another embodiment, data appliance 102 is configured to use the services of both servers (and/or additional servers not pictured). Further, in various embodiments, multiple virtual machine servers are present within the same platform. For example, cloud security service 122 can make use of multiple virtual machine servers (in addition to virtual machine server 124). In yet additional embodiments, at least some virtual machine servers are provided by an entity that is different from the operator of cloud security service 122. For example, cloud security service 122 could be operated by a computer security company which makes use of third party cloud computing services, such as Amazon Web Services (AWS), to provide at least some of the computer security company's virtual machine servers. Finally, while examples are described herein as making use of virtual machine servers (e.g., to allow for a single host system executing multiple guest systems at once), the techniques described herein, and in particular, the activities described as being performed inside a guest system, can also be performed using non-virtualized hardware (e.g., to thwart anti-virtual-machine techniques employed by malware).

Figure 2:
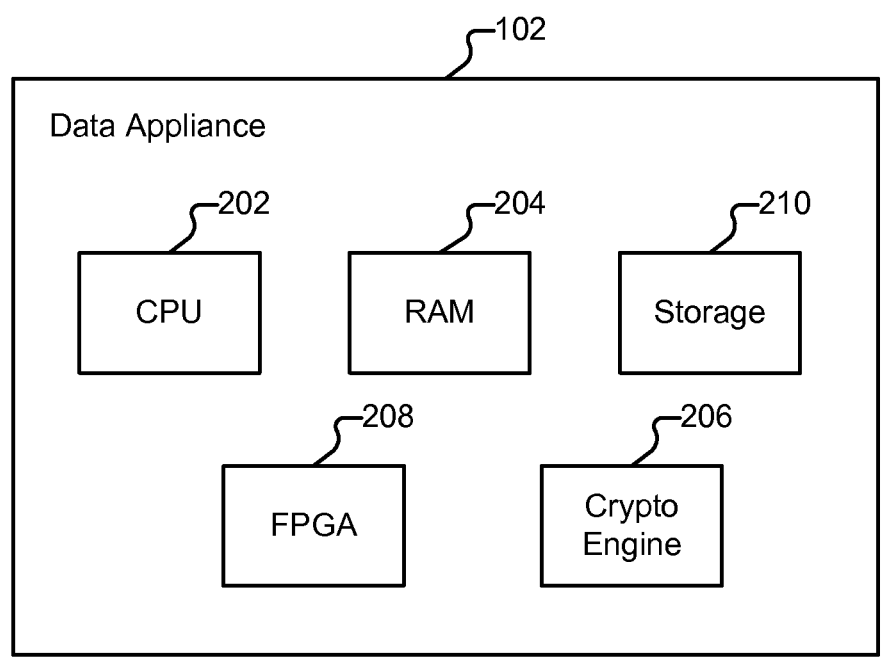
FIG. 2 illustrates an embodiment of a data appliance.

FIG. 2 illustrates an embodiment of a data appliance. The example shown is a representation of physical components that are included in appliance 102. Specifically, appliance 102 includes a high performance multi-core CPU 202 and RAM 204. Appliance 102 also includes a storage 210 (e.g., such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Figure 3:
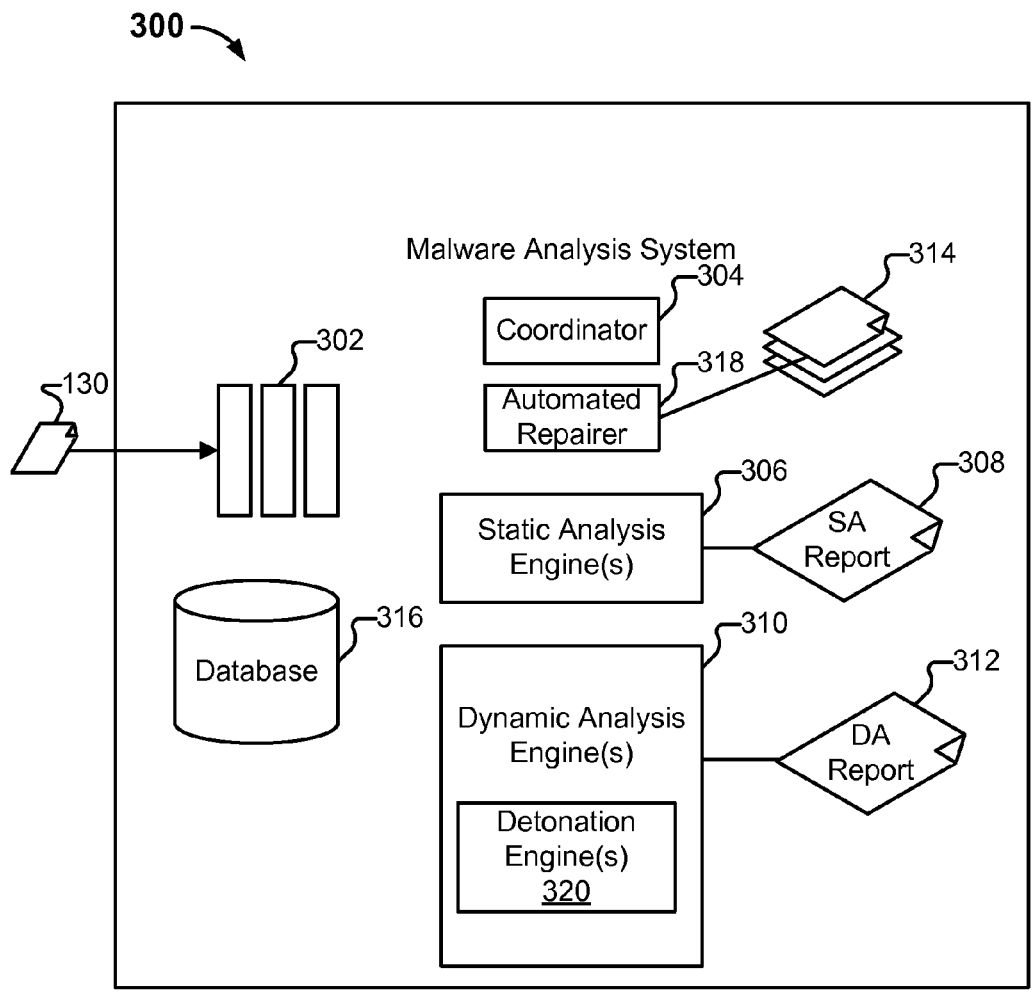
FIG. 3 illustrates an example of logical components that can be included in a system for analyzing candidate malware for automatic repair of corrupt files for a detonation engine in accordance with some embodiments.

Repairing Corrupt Files for Security Analysis of Malware Samples Using Virtual Machines to Analyze the Repaired Files FIG. 3 illustrates an example of logical components that can be included in a system for analyzing candidate malware for automatic repair of corrupt files for a detonation engine in accordance with some embodiments. System 300 can be implemented using a single physical device. System 300 can also be implemented, collectively, across multiple distinct devices. For example, when data appliance 102 works in combination with virtual machine server 112, malware analysis system 132 is an embodiment of system 300. As another example, the functionality of system 300 can be provided by cloud security service 122. As explained above, cloud security service 122 can include a single (124), or multiple virtual machine servers.

A virtual machine (VM) can be used to perform behavior profiling (e.g., in a VM sandbox environment) using various heuristic-based analysis techniques that can be performed in real-time during a file transfer (e.g., during an active file/attachment download) and/or on files previously collected (e.g., a collection of files submitted for batch analysis). Documents, executables, and other forms of potentially malicious software (e.g., to be evaluated) are referred to herein as "malware samples" or "samples."

Returning to the example of FIG. 1, suppose a malicious user of system 120 sends an email message to a user of client 104 that includes a malicious attachment. The attachment may be an executable (e.g., having an .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious, in accordance with various embodiments. If no signature for the attachment is found, data appliance 102 is configured to provide the attachment to a virtual machine server, such as virtual machine server 112 or 124, for analysis.

Virtual machine server 112 is configured to perform static analysis of samples, and also to perform dynamic analysis of samples, in which the samples are executed (or opened in an application, as applicable) in one or more virtual machine instances 114 and 116. The virtual machine instances may all execute the same operating system (e.g., Microsoft Windows® XP SP 2 or Microsoft Windows® 7 SP 1), may execute different operating systems, and/or may collectively execute combinations of operating systems (and/or versions thereof) (e.g., with VM instance 116 emulating an Android operating system). In one embodiment, the VM image(s) chosen to analyze the attachment are selected to match the operating system of the intended recipient of the attachment being analyzed (e.g., where the operating system of client 104 is Microsoft Windows® XP SP 2 or Microsoft Windows® 7 SP 1). Observed behaviors resulting from executing/opening the attachment (e.g., such as changes to certain platform, software, or registry settings, as well as any network connection attempts made) are logged and analyzed for indications that the attachment is malicious.

In one embodiment, the security analysis of a given malware sample is performed in two stages. In a first stage, a static analysis of the malware sample (e.g., files associated with the malware sample) is performed to determine whether any of the files are corrupt or otherwise should be repaired prior to attempting to execute such corrupt files during the dynamic analysis stage, as indicated in a static analysis (SA) report 308 (e.g., various other static analyses of the malware sample files can be performed to determine whether or not the malware sample can be determined to be malicious or benign based on the static analysis and/or to provide the output of the static analysis as input to the second stage for performing targeted dynamic analysis of the malware sample, such as further described below). The static analysis can be performed by a variety of components, such as an embodiment of static analysis engine 306, coordinator 304, automated repairer 318, and/or other components (not shown). Various techniques for detecting whether the malware sample includes a corrupt file are further described below. Also, various techniques for repairing corrupt files are also further described below. In a second stage, a dynamic analysis of the malware sample is performed to determine whether the malware sample can be determined to be malicious or benign based on monitored activity, such as external domains that a given piece of malware attempts to contact, registry setting changes, and/or other activities that can be monitored when executing the malware sample in an instrumented virtual environment (e.g., the malware sample is detonated/launched using a detonation engine 320 executed in an instrumented virtual machine instance of the malware analysis system), are logged and then analyzed as a set for indications that the monitored behavior can be associated with malware behavior/activity, as indicated in a dynamic analysis (DA) report 312. The monitored behavior analysis can be performed by a variety of components, such as an embodiment of dynamic analysis engine 310, coordinator 304, and/or other components (not shown) (e.g., as described in more detail below, e.g., in conjunction with process 500 of FIG. 5).

In one embodiment, the first stage of performing a static check for corrupt files in the malware sample is omitted (e.g., with all samples undergoing the second stage of dynamic analysis). In this case, a malware sample that fails to execute/detonate during the dynamic analysis stage can be identified as including one or more corrupt files, which can then be repaired as similarly described above, and then another attempt to execute/detonate the malware sample in the instrumented virtual machine environment using detonation engine 320 can be performed (e.g., as described in more detail below, e.g., in conjunction with process 400 of FIG. 4).

In one embodiment, log analysis (e.g., of results of static/dynamic analysis) is performed by the VM server (e.g., VM server 112). In another embodiment, the analysis is performed at least in part by appliance 102. The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable. For example, the functionality described herein (or portions thereof) as being provided by malware analysis system 132 can also be provided by cloud security service 122.

If the attachment is determined to be malicious, appliance 102 can automatically block the file transfer (e.g., file download) based on the analysis result. Further, a signature can be generated and distributed (e.g., to other data appliances, and/or to cloud security service 122) to automatically block future file transfer requests to download the file determined to be malicious. Using techniques described herein, a malware sample can be repaired as needed in order to detonate the malware sample to perform a dynamic analysis of the malware sample in an instrumented virtual environment (e.g., whether the malware sample needs to be repaired can be determined during static analysis and/or dynamic analysis stages of the malware as similarly described above).

As mentioned above, a given piece of candidate malware (e.g., a potentially malicious document/file/etc.) can be received for analysis in a variety of ways. In the following discussion, malware 130 (intended for a client such as client 104 by a malware author) is received by data appliance 102 and a check is made (e.g., against information stored in storage 210) to determine whether malware 130 matches any signatures of known malware. Suppose in the following example that no such signature is present on data appliance 102, and also that no such signature is present on cloud security service 122 (where data appliance 102 is configured to check for the existence of a signature on service 122). Data appliance 102 sends a copy of malware 130 to cloud security service 122 for further analysis (e.g., before allowing it to be delivered to client device 104). In various embodiments, when a new piece of candidate malware is received for analysis (e.g., an existing signature associated with the file is not present at cloud security service 122), it is added to a processing queue 302.

Coordinator 304 monitors queue 302, and as resources (e.g., a static analysis worker) become available, coordinator 304 fetches a piece of potential malware for analysis from queue 302 for processing (e.g., fetches a copy of malware 130). In particular, coordinator 304 first provides the application to static analysis engine 306 for static analysis. In one embodiment, one or more static analysis engines are included within system 300, where system 300 is a single device. In another embodiment, static analysis is performed by a separate static analysis server that includes a plurality of workers (i.e., a plurality of instances of static analysis engine 306). In yet another embodiment, static analysis is omitted, or provided by a third party, as applicable.

The static analysis engine obtains general information about the candidate malware and includes it (e.g., along with heuristic and other information, as applicable) in a static analysis report 308. In one embodiment, a pre-screening of the malware sample is performed based on, for example, a static analysis for determining whether one or more files associated with the malware sample are corrupt or otherwise should be repaired using automated repairer component 318 (e.g., repaired files are shown at 314 of FIG. 3) prior to proceeding to the dynamic analysis stage, such as similarly described above and further described below. The report can be created by the static analysis engine, or by coordinator 304 (e.g., or by another appropriate component) which can be configured to receive the information from static analysis engine 306. In one embodiment, the collected information is stored in one or more database records for the candidate malware (e.g., in a database 316), instead of or in addition to a separate static analysis report 308 being created (i.e., portions of the database record form the static analysis report 308).

Once the static analysis is complete, coordinator 304 locates an available dynamic analysis engine 310 to perform dynamic analysis on the candidate malware. In one embodiment, in an event that the static analysis determined that one or more files associated with the malware sample are corrupted or otherwise should be repaired, then such files are repaired using automated repairer component 318 (e.g., repaired files are shown at 314 of FIG. 3) prior to proceeding to the dynamic analysis stage, such as similarly described above and further described below. As with static analysis engine 306, system 300 can include one or more dynamic analysis engines directly. In another embodiment, dynamic analysis is performed by a separate dynamic analysis server that includes a plurality of workers (i.e., a plurality of instances of dynamic analysis engine 310).

Each dynamic analysis engine manages a virtual machine instance. In one embodiment, results of static analysis (e.g., performed by static analysis engine 306), whether in report form (308) and/or as stored, e.g., in database 316, are provided as input to a dynamic analysis engine 310. For example, the static analysis report information can be used to help select/customize the virtual machine instance used by dynamic analysis engine 310 (e.g., Microsoft Windows XP SP 3 vs. Windows 7 SP 2). Where multiple virtual machine instances are executed at the same time, a single dynamic analysis engine can manage all of the instances, or multiple dynamic analysis engines can be used (e.g., with each managing its own virtual machine instance), as applicable. In one embodiment, in an event that the malware sample cannot be detonated during the dynamic analysis (e.g., it can be determined that one or more files associated with the malware sample are corrupted or otherwise should be repaired), then such files are repaired using automated repairer component 318 (e.g., repaired files are shown at 314 of FIG. 3) prior to re-attempting to detonate the malware sample to successfully perform and complete the dynamic analysis stage, such as similarly described above and further described below. As will be explained in more detail below, during the dynamic portion of the analysis, actions taken by the application are analyzed. For example, a list of any domains dynamically generated by the application is collected (e.g., domains which the application attempts to access that are not hard coded/were otherwise not discovered during static analysis).

In various embodiments, static analysis of candidate malware is omitted/in-part or is performed by a separate entity, as applicable. As one example, the pre-screening of the malware sample based on static analysis for determining whether one or more files associated with the malware sample are corrupt or otherwise should be repaired can be omitted, such as similarly described above and further described below (e.g., a static analysis of malware sample file pre-check can be performed based on reverse engineering of validation code performed by a file integrity check, such as performed by the Windows PE loader). As another example, traditional static and/or dynamic analysis may be performed on files by a first entity. Once it is determined (e.g., by the first entity) that a given file is malicious, various remedial actions can be performed.

For example, malware samples (e.g., one or more files) are sent to the malware analysis system for malware analysis. The malware analysis system can perform various static analysis and dynamic analysis to determine whether a received malware sample is determined to be malware or benign (e.g., or may require further analysis if the malware is deemed suspicious). In this example, the dynamic analysis of the malware sample is performed to determine whether the malware sample can be determined to be malicious or benign based on monitored activity during the execution of the malware sample, such as external domains that a given piece of malware attempts to contact, registry setting changes, and/or other activities that can be monitored when executing the malware sample in an instrumented virtual environment (e.g., the malware sample is detonated/launched using the detonation engine executed in an instrumented virtual machine instance of the malware analysis system), are logged and then analyzed as a set for indications that the monitored behavior can be associated with malware behavior/activity, which can then be logged/reported in the dynamic analysis (DA) report.

However, in some cases, one or more of the malware sample files are corrupted (e.g., executable PE files, and/or other types/formats of files, such as Microsoft Word documents such as (.doc) files, Adobe Portable Document Format (PDF) files, web documents such as HTML files, compressed/archived file types such as zipped (.zip) files, and/or various other file formats, such as further described below). Malware sample files can be corrupted as a result of various causes, such as hardware damage (e.g., hard drive or file system damage, etc.), a network connection was dropped during a file transit operation (e.g., during a file download, such as a malware sample file that is prematurely interrupted or stopped during such a file download operation, or a network connection/communication that is lost/dropped during a file transmission/download operation, etc.), and/or a decoder error (e.g., a decoder bug/error in one or more of the decoders of the firewall, etc.).

As an example, a file in the PE format (e.g., a PE file) can be corrupted and non-executable if the header information indicates a length that is greater than the size/length of the file. Specifically, a PE file generally includes a header for each section that indicates a length of that section of the PE file, and if the PE file is less than the total of indicated lengths of each of the sections indicated in these headers' total indicated length, then the PE file has been truncated or otherwise corrupted (e.g., missing data from/portions of the PE file).

In one embodiment, in an event that the PE file, in this example, is determined to be truncated or otherwise corrupted, the automated repairer component (e.g., automated repairer 318 as shown in FIG. 3) is executed to repair the PE file. For example, the automated repairer component can fill/pad the remainder of the PE file with data (e.g., NOPs, 0's, F's, and/or any other data) to ensure that the length of the PE file is sufficient (e.g., matches or exceeds) to satisfy a valid PE file check that is performed by a PE loader (e.g., the Windows PE loader) based on the PE file length (e.g., a PE file integrity check that is performed prior to allowing the PE file to be executed on a Microsoft Windows® operating system environment). As such, truncated or otherwise corrupted PE files can be detonated (e.g., using detonation engine 320 as shown in FIG. 3) to perform the dynamic analysis (e.g., using dynamic analysis engine(s) 310 as shown in FIG. 3). While the truncated or otherwise corrupted/missing data from the PE file cannot necessarily be recovered or restored, by detonating/executing such PE file in the instrumented virtual environment, dynamic analysis can at least be (partially) performed with respect to the portion of the PE file that was received/present in the received PE file.

In an example implementation, the automated repairer can fill/pad the remainder of the PE file with data (e.g., NOPs, 0's, F's, and/or any other data) to ensure that the length of the PE file is sufficient (e.g., matches or exceeds) to satisfy a valid PE file check that is performed by a PE loader (e.g., the Windows PE loader) based on the PE file length (e.g., a PE file integrity check that is performed prior to allowing the PE file to be executed on a Microsoft Windows® operating system environment). An example of a segment of Python code for filling a remainder of a PE file with data by padding the file with 10 MB of zeroes is provided below.

```
input_file=open('truncated.exe', 'rb')
output_file=open('fixed.exe', 'wb')
input_data=input_file.read( )
output_data=input_data+.zfill(10*1024*1024)
output_file.write(output_data)
output_file.close( )
input_file.close( )
```

In another embodiment, the instrumented virtual environment includes a modified Windows PE loader that is configured to bypass the valid PE file check that is based on the PE file length (e.g., a PE file integrity check that is performed prior to allowing the PE file to be executed on a Microsoft Windows® operating system environment). As such, truncated or otherwise corrupted PE files can be detonated (e.g., using detonation engine 320 as shown in FIG. 3) to perform the dynamic analysis (e.g., using dynamic analysis engine(s) 310 as shown in FIG. 3).

As a result, dynamic analysis can be performed with respect to at least the partial/truncated PE file. In some cases, such dynamic analysis can detect some of the malicious activity (if any) (e.g., before execution of the PE file crashes or even if it crashes as sometimes the code/system can gracefully handle missing resources (if any)). Accordingly, the disclosed techniques for automatic repair of corrupt files (e.g., malware sample files) for a detonation engine enable the malware analysis system to successfully detonate the partial/truncated PE file and, in some cases, to also collect additional security/malware related intelligence based on the monitored execution of the disclosed techniques during the dynamic analysis (e.g., such as detecting an attempt to contact a new IP address/domain, an attempt to modify a registry setting, and/or to perform another activity).

Thus, the disclosed techniques facilitate dynamic malware analysis for corrupted malware samples that otherwise could not be detonated for execution in the malware analysis system. As such, the disclosed techniques can be useful to be able to provide malware determinations for malware sample files that are corrupt (e.g., even though such corrupt PE/other files would typically not be able to execute in the target computing environment, as for example, such corrupt PE/other files would similarly fail such file integrity checks) for customers of the cloud security service and/or to further gain security intelligence as discussed above. Moreover, the disclosed techniques do not solely rely on signature-based analysis techniques (e.g., in some cases, static analysis can include signature-based analysis techniques, but such which signature-based analysis techniques would typically be ineffective, for example, if the signature would need to match a missing/truncated or otherwise corrupted portion of a corrupt malware sample file).

As further described below, the disclosed techniques are similarly applicable to other file formats. For example, the disclosed techniques can generally be applied to many different file types (e.g., with just different repair operations that would be applied to different file types for the fixes based on the different corruption/problems with such different file types). Examples of various file types that can similarly be automatically repaired using the disclosed techniques will now be described.

As similarly described above, PE files (e.g., PE executable files and/or dynamically linked libraries (DLLs)) can be analyzed to determine if a section length totals to less than the file size. If so, then the automatic repairer component can be configured to pad the file with zeroes to at least a section length total.

With respect to PDF formatted files (e.g., .pdf file extensions), the automatic repairer component can be configured to replace missing terminators (e.g., a stream should be terminated with an endstream, an obj should be terminated with an endobj, etc.) and/or to replace missing end of file (e.g., %% EOF tags).

With respect to Microsoft Office formatted files (e.g., .doc, .xls, .ppt, etc. file extensions), the automatic repairer component can be configured to determine if a next sector is missing. If so, then mark as end of chain and/or to fix a corrupted page count in a header.

With respect to zip formatted files (e.g., .zip file extensions), the automatic repairer component can be configured to re-create a central directory that is located at the end of the file by scanning for Local File Headers.

With respect to HTML formatted files (e.g., .html file extensions), the automatic repairer component can be configured to add missing terminators (e.g., <HTML> </HTML>).

With respect to XML formatted files (e.g., .xml file extensions), the automatic repairer component can be configured to add missing terminators (e.g., </>).

With respect to Microsoft Office formatted files (e.g., .docx, .xlsx, and/or other file extensions), the automatic repairer component can be configured to perform various eXtensible Markup Language (XML) and zip techniques (e.g., such files are zipped directories of XML files). As will now be apparent to one of ordinary skill in the art, the disclosed techniques can generally be applied to many different file types (e.g., with just different repair operations that would be applied to different file types for the fixes based on the different corruption/problems with such different file types). For example, the disclosed techniques can similarly be applied to various field types and or fields that can be analyzed and repair operations can be performed to correct any problems with the file(s) (e.g., checksums, padding files with data, such as similarly described above).

Processes for Automatic Repairing of Corrupt Files in Malware Samples

Figure 4:
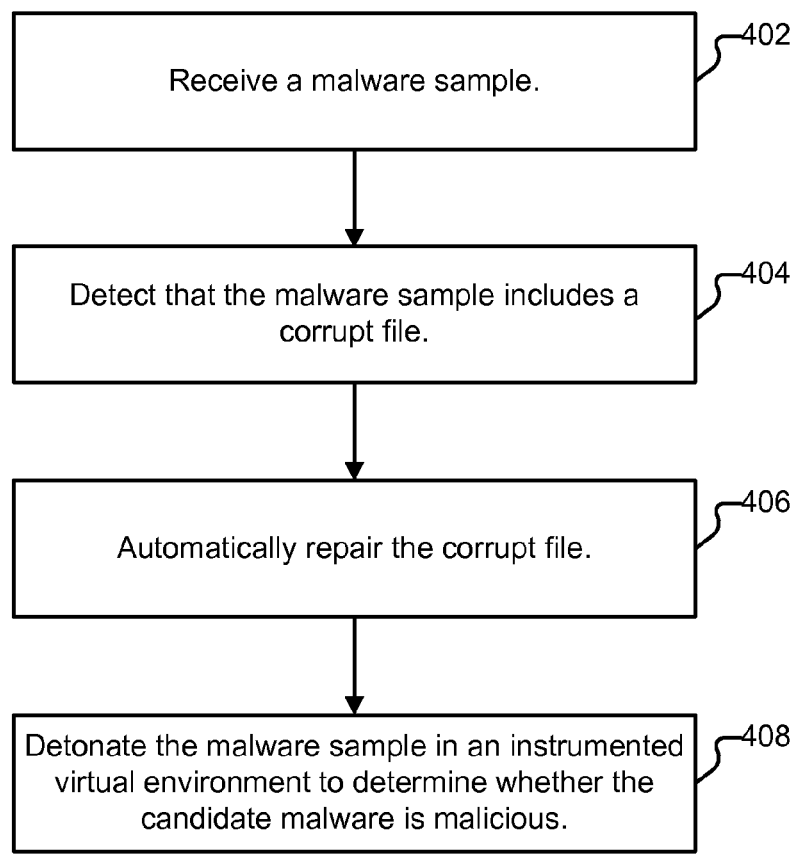
FIG. 4 is a flow diagram of a process for automatic repair of corrupt files for a detonation engine in accordance with some embodiments.

FIG. 4 is a flow diagram of a process for automatic repair of corrupt files for a detonation engine in accordance with some embodiments. In various embodiments, the process shown in FIG. 4 is performed by the network device/firewall as similarly described above with respect to FIGS. 1-3.

In various embodiments, process 400 is performed by system 300 (e.g., examples of which include malware analysis system 132 and cloud security service 122). The process begins at 402 when a malware sample is received. As one example, candidate malware is received at 402 when an email (e.g., including an attachment) is received by data appliance 102 from system 120. As another example, data appliance 102 can be configured to transmit the attachment to service 122 for analysis. In that scenario, the candidate malware is received by service 122 at 402. As yet another example, candidate malware can be received at 402 as part of a batch operation (e.g., where cloud security service 122 receives a variety of malware samples over a period of time and a batch of received samples is provided to virtual machine server 124 for processing—with virtual machine server 124 receiving the batch at 402). Further, the batch operation can be repeated (e.g., on the same set of samples— or on a set that includes at least some of the same samples as previous batches).

At 404, whether the malware sample includes a corrupt file is determined. For example, if the malware sample fails to detonate, then the malware sample can be deemed to include a corrupt file. As another example, a pre-screening operation can be performed to determine whether the malware sample includes a corrupt file, such as similarly described above with respect to FIG. 3.

At 406, in an event that the malware sample is determined to include the corrupt file, the corrupt file is repaired for a detonation engine. For example, various different file types can be automatically repaired using the disclosed techniques, such as similarly described above with respect to FIG. 3.

At 408, the malware sample is detonated in a malware analysis system to determine whether the candidate malware is malicious (e.g., or benign). For example, the detonated malware sample can be analyzed using an instrumented virtual environment to perform a dynamic analysis (e.g., virtual machine instance is initialized, setting up the running environment for the malware to be tested, such as malware 130 as shown in FIGS. 1 and 3), such as similarly described above with respect to FIG. 3. In this example, the virtual machine instance is started, and the malware sample (e.g., malware sample 130) is executed in the virtual machine instance. The virtual environment is instrumented/hooked, as applicable, such that behaviors observed while the application is executing are logged. For example, a log is created of activities as they occur in the virtual machine instance (e.g., using a customized kernel that supports hooking and logcat). Further, network traffic associated with the virtual machine instance is captured (e.g., using pcap). As with the static analysis engine, the dynamic analysis engine stores the results of its analysis in database 316 (e.g., as shown in FIG. 3) in the record(s) associated with the application being tested (e.g., any attempts at external contacts made by the virtual machine instance can be recorded in database 316 and/or the results can be included/stored in report 312 as applicable). As mentioned above, a static analysis can optionally be performed on the sample, as similarly described above with respect to FIG. 3.

Figure 5:
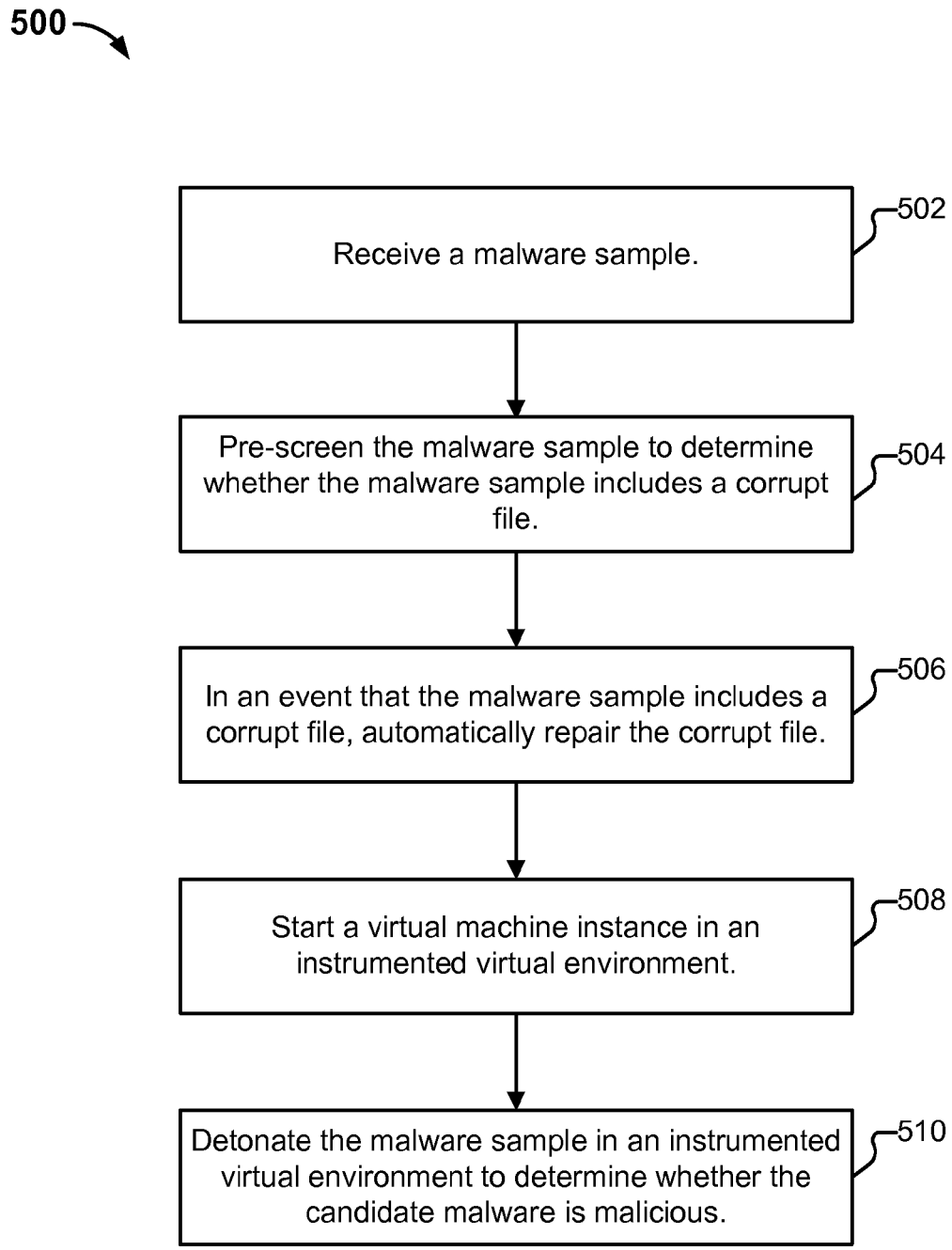
FIG. 5 is another flow diagram of a process for automatic repair of corrupt files for a detonation engine in accordance with some embodiments.

FIG. 5 is another flow diagram of a process for automatic repair of corrupt files for a detonation engine in accordance with some embodiments. In various embodiments, the process shown in FIG. 5 is performed by the network device/firewall as similarly described above with respect to FIGS. 1-3.

In various embodiments, process 500 is performed by system 300 (e.g., examples of which include malware analysis system 132 and cloud security service 122). The process begins at 502 when a malware sample is received. As explained above, malware samples can be received in a variety of ways. In the following example, suppose the malware sample is received at 502 as a submission from appliance 102. For example, two or more samples can be received in parallel and can also be received in sequence. Further, the two or more samples can be received at different times and from different sources (e.g., with a first sample being provided by data appliance 102 and a second sample obtained from database 316 or another appliance, as applicable). Portions 504 and 506 of process 500 (described in more detail below) can be performed in parallel with one another, in sequence, or asynchronously.

At 504, pre-screening of the malware sample is performed to determine whether the malware sample includes a corrupt file. For example, whether the malware sample includes a corrupt file can be determined based on a pre-screening static analysis of the malware sample, such as similarly described above with respect to FIG. 3.

At 506, in an event that the malware sample is determined to include the corrupt file, the corrupt file is repaired for a detonation engine. For example, various different file types can be automatically repaired using the disclosed techniques, such as similarly described above with respect to FIG. 3.

At 508, a virtual machine (VM) instance in an instrumented virtual environment is started. For example, the virtual machine instance can be initialized, setting up the running environment for the malware to be tested, such as malware 130 as shown in FIGS. 1 and 3, such as similarly described above with respect to FIG. 3. In this example, the virtual machine instance is started, and the malware sample (e.g., malware sample 130) can then be executed in the virtual machine instance (e.g., as described below at 510). The virtual environment is instrumented/hooked, as applicable, such that behaviors observed while the application is executing are logged.

At 510, the malware sample is detonated in a malware analysis system to determine whether the candidate malware is malicious (e.g., or benign). For example, a log is created of activities as they occur in the virtual machine instance (e.g., using a customized kernel that supports hooking and logcat). Further, network traffic associated with the virtual machine instance is captured (e.g., using pcap). As with the static analysis engine, the dynamic analysis engine stores the results of its analysis in database 316 (e.g., as shown in FIG. 3) in the record(s) associated with the application being tested (e.g., any attempts at external contacts made by the virtual machine instance can be recorded in database 316 and/or the results can be included/stored in report 312 as applicable). As mentioned above, additional static analysis can optionally be performed on the sample, as similarly described above with respect to FIG. 3.

Remedial Actions

As explained above, a log of external contacts which malware sample 130 attempts to make (e.g., during dynamic analysis) can be created (e.g., at 408). The list of external contact attempts can be used in a variety of ways. As a first example, the list can be provided to a DNS appliance (or appliance that includes a DNS module). The DNS appliance/module can use the received list as a blacklist—refusing to resolve any requests made by a client (e.g., client 104) for a given blacklisted external contact (e.g., "bad-site.com").

As will now be apparent to one of ordinary skill in the art, various other remedial actions can be performed based on the successful detonation of the malware sample using the disclosed techniques in order to perform dynamic security analysis on the malware sample using the malware analysis system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automatic repairing of malware sample files for a detonation engine, comprising:
    a processor; and
    a memory coupled with the processor, wherein the memory is configured to provide the processor with instructions which when executed cause the processor to:
    receive a malware sample from a network device;
    determine whether the malware sample includes a corrupt file, wherein the corrupt file fails to execute in a target execution environment; and
    in an event that the malware sample is determined to include the corrupt file, repair the corrupt file for the detonation engine, comprising to:
    perform the following:
        A) determine whether the corrupt file includes a portable executable file, comprising to:
            determine that header information of the portable executable file indicates that a file length of the portable executable file is different from an actual file length of the portable executable file to determine that the corrupt file includes the portable executable file; and
            in the event that the corrupt file includes the portable executable file,
            add data to the portable executable file in order for the file length of the header information of the portable executable file to match the actual file length of the portable executable file;
        B) determine whether the corrupt file includes a Microsoft Office formatted file; and
            in the event that the corrupt file includes the Microsoft Office formatted file, fix a page count in a header;
        C) determine whether the corrupt file includes a portable document format file; and
            in the event that the corrupt file includes the portable document format file, replace a missing terminator or a missing end of file;
        D) determine whether the corrupt file includes a zip formatted file; and
            in the event that the corrupt file includes the zip formatted file, recreate a central directory that is located at an end of the zip formatted file; and
        E) determine whether the corrupt file includes a Hypertext Markup Language (HTML) formatted file; and
            in the event that the corrupt file includes the HTML formatted file, add a missing terminator;
    allow the malware sample to be executed in an instrumented virtual environment using the detonation engine; and
    determine that the malware sample includes the corrupt file during a dynamic analysis of the malware sample based on a failed attempt to detonate the malware sample using the detonation engine.

2. The system of claim 1 wherein the processor is further configured to: determine that the malware sample includes the corrupt file during a static analysis of the malware sample.

3. The system of claim 1 wherein the processor is further configured to: determine that the malware sample includes the corrupt file during a static analysis of the malware sample based on a pre-screening of the malware sample to determine whether the malware sample includes the corrupt file.

4. A method of automatic repairing of malware sample files for a detonation engine, comprising:
    receiving a malware sample from a network device;
    determining whether the malware sample includes a corrupt file, wherein the corrupt file fails to execute in a target execution environment; and
    in an event that the malware sample is determined to include the corrupt file, repairing the corrupt file for the detonation engine, comprising:
    performing the following:
        A) determining whether the corrupt file includes a portable executable file, comprising:
            determining that header information of the portable executable file indicates that a file length of the portable executable file is different from an actual file length of the portable executable file to determine that the corrupt file includes the portable executable file; and
            in the event that the corrupt file includes the portable executable file,
            adding data to the portable executable file in order for the file length of the header information of the portable executable file to match the actual file length of the portable executable file;
        B) determining whether the corrupt file includes a Microsoft Office formatted file; and
            in the event that the corrupt file includes the Microsoft Office formatted file, fixing a page count in a header;
        C) determining whether the corrupt file includes a portable document format file; and
            in the event that the corrupt file includes the portable document format file, replacing a missing terminator or a missing end of file;
        D) determining whether the corrupt file includes a zip formatted file; and
            in the event that the corrupt file includes the zip formatted file, recreating a central directory that is located at an end of the zip formatted file; and
        E) determining whether the corrupt file includes a Hypertext Markup Language (HTML) formatted file; and
            in the event that the corrupt file includes the HTML formatted file, adding a missing terminator;
    allowing the malware sample to be executed in an instrumented virtual environment using the detonation engine; and
    determining that the malware sample includes the corrupt file during a dynamic analysis of the malware sample based on a failed attempt to detonate the malware sample using the detonation engine.

5. The method of claim 4 further comprising: determining that the malware sample includes the corrupt file during a static analysis of the malware sample.

6. The method of claim 4 further comprising: determining that the malware sample includes the corrupt file during a static analysis of the malware sample based on a pre-screening of the malware sample to determine whether the malware sample includes the corrupt file.

7. A computer program product for automatic repairing of malware sample files for a detonation engine, the computer program product being embodied in a tangible non-transitory computer readable storage medium and comprising computer instructions for:
   receiving a malware sample from a network device;
   determining whether the malware sample includes a corrupt file, wherein the corrupt file fails to execute in a target execution environment; and
   in an event that the malware sample is determined to include the corrupt file, repairing the corrupt file for the detonation engine, comprising:
   performing the following:
     A) determining whether the corrupt file includes a portable executable file, comprising:
       determining that header information of the portable executable file indicates that a file length of the portable executable file is different from an actual file length of the portable executable file to determine that the corrupt file includes the portable executable file; and
       in the event that the corrupt file includes the portable executable file,
         adding data to the portable executable file in order for the file length of the header information of the portable executable file to match the actual file length of the portable executable file;
     B) determining whether the corrupt file includes a Microsoft Office formatted file; and
       in the event that the corrupt file includes the Microsoft Office formatted file, fixing a page count in a header;
     C) determining whether the corrupt file includes a portable document format file; and
       in the event that the corrupt file includes the portable document format file, replacing a missing terminator or a missing end of file;
     D) determining whether the corrupt file includes a zip formatted file; and
       in the event that the corrupt file includes the zip formatted file, recreating a central directory that is located at an end of the zip formatted file; and
     E) determining whether the corrupt file includes a Hypertext Markup Language (HTML) formatted file; and
       in the event that the corrupt file includes the HTML formatted file, adding a missing terminator; terminator;
   allowing the malware sample to be executed in an instrumented virtual environment using the detonation engine; and
   determining that the malware sample includes the corrupt file during a dynamic analysis of the malware sample based on a failed attempt to detonate the malware sample using the detonation engine.

8. The computer program product recited in claim 7 further comprising computer instructions for: determining that the malware sample includes the corrupt file during a static analysis of the malware sample.

* * * * *